US012702910B1

(12) United States Patent
Chau

(10) Patent No.: US 12,702,910 B1
(45) Date of Patent: Aug. 11, 2026

(54) ACQUISITION AND REAL-TIME DISPLAY SYSTEM OF GOLF SWING VIDEO WITH MULTI-STREAM MERGING

(71) Applicant: Hon Chau, San Jose, CA (US)

(72) Inventor: Hon Chau, San Jose, CA (US)

( * ) Notice: Subject to any disclaimer, the term of this patent is extended or adjusted under 35 U.S.C. 154(b) by 372 days.

(21) Appl. No.: 18/238,488

(22) Filed: Aug. 27, 2023

(51) Int. Cl.
*A63B 69/36* (2006.01)
*H04N 21/218* (2011.01)
*H04N 21/234* (2011.01)

(52) U.S. Cl.
CPC ....... *A63B 69/36* (2013.01); *H04N 21/21805* (2013.01); *H04N 21/23424* (2013.01)

(58) Field of Classification Search
CPC ............. A63B 69/36; H04N 21/21805; H04N 21/23424
USPC ....... 473/131, 151, 152, 219, 223, 233, 239, 473/288, 289, 407, 409
See application file for complete search history.

(56) References Cited

U.S. PATENT DOCUMENTS 4,137,566 A * 1/1979 Haas .................. A63B 24/0003 73/167
6,304,665 B1 * 10/2001 Cavallaro .......... A63B 71/0605 382/106
6,359,647 B1 * 3/2002 Sengupta ......... G08B 13/19641 348/E7.086
9,141,859 B2 * 9/2015 Vunic .................... G06V 20/40
11,207,582 B2 * 12/2021 Lewis ..................... G06T 7/292
2002/0064764 A1 * 5/2002 Fishman ............ A63B 69/3629 434/252
2004/0162154 A1 * 8/2004 DeJohn .............. A63B 24/0003 473/266
2005/0261071 A1 * 11/2005 Cameron ........... A63B 69/3682 473/219
2007/0283380 A1 * 12/2007 Aoki ........................ H04N 7/15 348/E7.083
2015/0348591 A1 * 12/2015 Kaps ...................... G11B 27/17 386/201
2016/0158626 A1 * 6/2016 Dolige ............... A63B 24/0003 700/92
2016/0314818 A1 * 10/2016 Kirk .................... G06F 3/04845
2017/0094326 A1 * 3/2017 Arimilli ............. H04N 21/2393

* cited by examiner

*Primary Examiner* — Nini F Legesse
(74) *Attorney, Agent, or Firm* — Adibi IP Group, PC; Amir V. Adibi; Kian Tanner

(57) ABSTRACT

Methods and apparatus for acquisition and display of golf swing video streams are disclosed. In one embodiment, a method is provided that includes establishing connections to a plurality of cameras configured to record golf swing video streams of a user, and initiating transmission of the recorded golf swing video streams from the plurality of cameras in response to input from the user. The method includes receiving the recorded golf swing video streams over the established connections, identifying a start time and a stop time associated with each golf swing video stream, merging the golf swing video streams based on their respective start and stop times to form a merged video stream, and displaying the merged video stream. An annotation interface allows the user to annotate and/or draw virtual lines on obtained video. Each video stream or merged video is stored on console or cloud-based storage.

18 Claims, 17 Drawing Sheets

SYSTEM OVERVIEW

SYSTEM OVERVIEW

CONSOLE DEVICE

CAMERA DEVICE

NETWORK DEVICE

IMAGE STREAM TIME ALIGNMENT

METHOD OF OPERATION

METHOD OF OPERATION

METHOD OF MERGING STREAMS

METHOD OF ANNOTATION AND FEEDBACK

SCREEN SHOT
TWO-CAMERA LAYOUT (EMPTY)

SCREEN SHOT
TWO-CAMERAS ACTIVE (WITH ANNOTATIONS)

SCREEN SHOT
FOUR-CAMERAS ACTIVE (WITH ANNOTATIONS)

LANDING PAGE

RECORDING MENU

SESSION HOST

SESSION JOIN

GENERAL SETTINGS

VIDEO LIBRARY

ACQUISITION AND REAL-TIME DISPLAY SYSTEM OF GOLF SWING VIDEO WITH MULTI-STREAM MERGING

TECHNICAL FIELD

The present invention relates generally to video training devices, and more specifically, to methods and apparatus for a real-time video streaming and merging system using multiple cameras and associated training methods for golf.

BACKGROUND INFORMATION

There is an on-going interest in providing golfers at all levels with video feedback to improve their golf swing. It is hard to perceive the movements of the body, such as the movement of the hips and shoulders during a golf swing, especially when the golfer is looking directly at the ball.

SUMMARY

In various exemplary embodiments, a real-time video streaming and video merging system using multiple cameras is provided to acquire and process golf swing video streams. The system provides a video feedback solution for golfers to view their swings from multiple camera angles. During operation, the system streams live video feeds of a user's swing from multiple camera angles to a single console device on which the user can view the live video streams. The user can then provide input to command the system to record video for a selected time duration. The user then hits one or more golf balls while the cameras record the user. The recorded golf swing video streams are then transmitted from the cameras to the central console. A merged video stream is generated at the central console that allows the golfer to view the golf swing from all camera angles either at once (merged) or to switch between them. Thus, the system operates to capture golf swing video streams of the user at various frame rates per second from multiple camera angles and then merges the streams into a synchronized video stream of the user's golf swing.

Having the ability to see the body movement from a variety of angles in real-time while practicing allows a golfer to effectively perform practice drills and instantly see whether they are executing the drills properly. Each camera angle offers a different perspective of the swing and when merged together, the merged image gives the golfer a holistic view of their golf swing. In one embodiment, a "down-the-line" camera angle shows the plane of the backswing, where the club face is pointing at the top of the swing, and whether the golfer's hips move too early towards the golf ball during the swing. A "face on" camera angle shows the golfer's head position, ball position, and any hip sway or lateral movement that occurs during the swing. The system results in a portable and cost effective solution that provides real-time multiple camera video streams of a user's golf swing for viewing and training purposes.

In one embodiment, a method is provided that includes establishing connections to a plurality of cameras that are configured to record golf swing video streams of a user, and initiating transmission of the recorded golf swing video streams from the plurality of cameras in response to input from the user. The method also includes receiving the recorded golf swing video streams over the established connections, identifying a start time and a stop time associated with each golf swing video stream, merging the golf swing video streams based on their respective start and stop times to form a merged video stream, and displaying the merged video stream.

In another embodiment, an apparatus is provided that comprises a plurality of cameras that are configured to record video streams of a user and a portable control console. The portable control console is configured to establish connections to the plurality of cameras. The portable control console is also configured to initiate transmission of the recorded video streams from the plurality of cameras in response to input from the user. The portable control console is also configured to receive the recorded video streams over the established connections. The portable control console is also configured to identify a start time and a stop time associated with each video stream. The portable control console is also configured to merge the video streams based on their respective start and stop times to form a merged video stream. The portable control console is also configured to display the merged video stream.

In yet another embodiment, a real-time video streaming and video merging system includes coaching functionality. The novel system allows coaches to install a software application on their mobile, tablet, or desktop device, or to access an online, web-based portal. The system allows the golfer to configure the console and any number of camera devices at desired viewing angles and to establish a connection with one or more coaches that can view each video stream and/or merged video streams. Coaches are able to view real-time streams of a golfer practicing their swing. Coaches can provide real-time feedback, annotate, comment, track performance, and golf swing training sessions for one or more golf students. In one example, a golfer generates a share link or access code on a console device that is then shared with one or more coaches. Each coach accesses the share link or input the access code on a mobile application or web-based portal thereby establishing a session between the coaching device and the console near the golfer. This allows coaches to remotely or on-site (e.g., club house) provide feedback and coach golfers on their golf swing.

In yet another embodiment, a real-time video streaming and video merging system provides a marketplace in which coaches offer their golf swing training services. Golf students are able to purchase training sessions via the system. Golf students are also able to rank coaches and track their progress and performance.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 5A is a diagram showing how camera devices transmit their respective image stream to a console device.

DETAILED DESCRIPTION

Reference will now be made in detail to some embodiments of the invention, examples of which are illustrated in the accompanying drawings.

Figure 1:
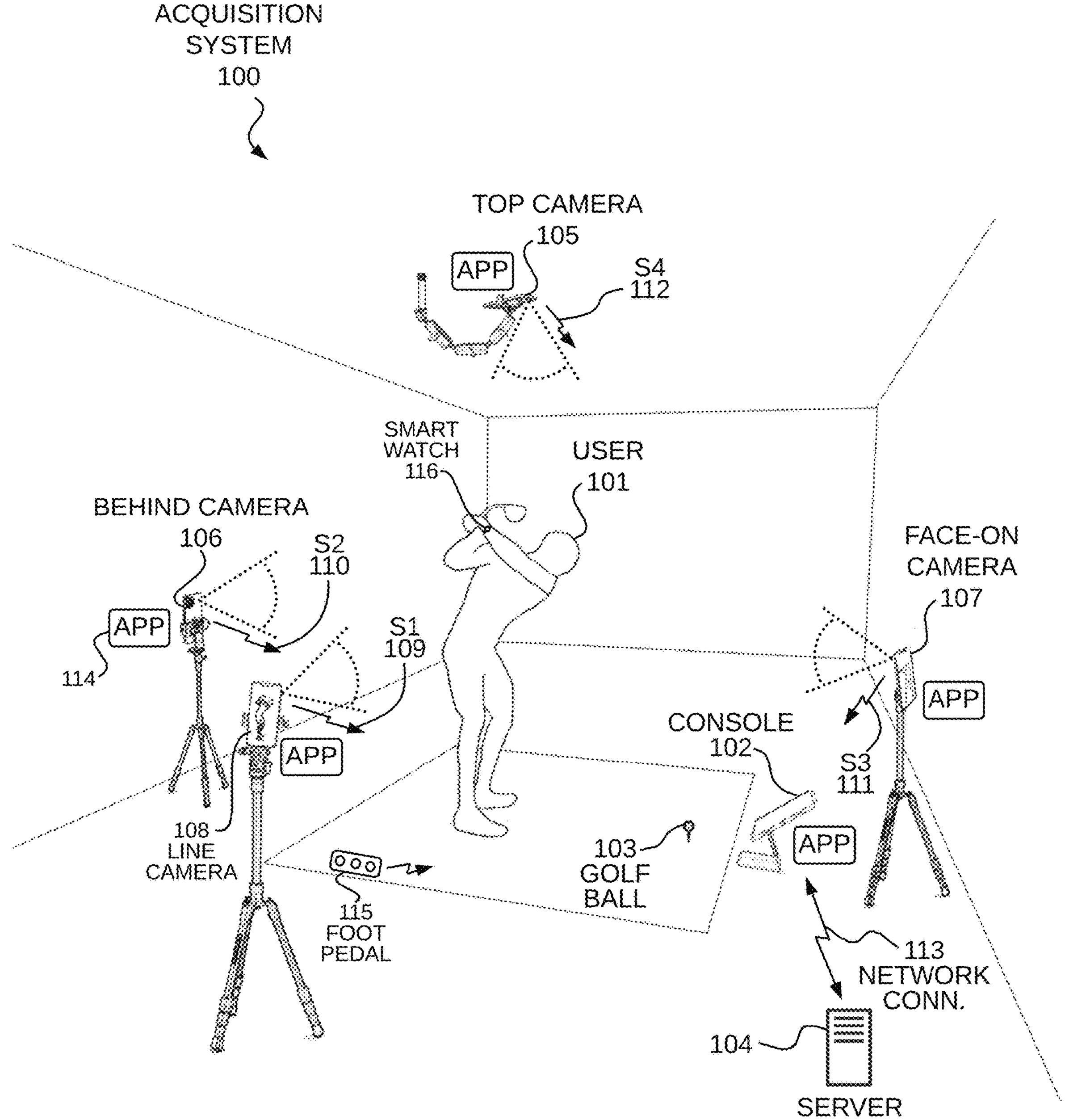
FIG. 1 is a diagram showing a golf swing acquisition system.

FIG. 1 is a diagram showing an exemplary embodiment of a golf swing acquisition system 100. In this embodiment, video streams of a user 101 swinging a golf club are captured by multiple cameras at multiple camera angles and transmitted to a console 102. In one embodiment, the console 102 is a tablet computing device running a mobile software application. Four camera devices (105, 106, 107, and 108) are configured to capture corresponding video streams (S1 109, S2 110, S3 111, and S4 112) of the user 101 hitting a golf ball 103. In one embodiment, the camera device is a mobile communication device running the mobile software application. Each video stream is wirelessly transmitted from the corresponding camera device to the console 102.

To start the system, the user 101 launches an application 114 on the console 102 and places the console on the ground about a foot away from the ball 103. The user then launches the application 114 on each of the camera devices (105, 106, 107, and 108). In one embodiment, the camera devices are smartphones that are positioned at desired locations. The application 114 connects each camera device to the console 102 via a wireless connection, such as a WIFI or Bluetooth connection. In one embodiment, each of the camera devices (105, 106, 107, and 108) downloads and installs a camera software application that allows the camera device to communicate and transmit real-time video to the application 114 operating on the console device 102. In another embodiment, each of the camera devices (105, 106, 107, and 108) downloads and installs the same application 114 and the user 101 identifies each device as a camera device on a user interface provided by the application 114.

The camera devices (105, 106, 107, and 108) are mounted or placed on tripods at various locations and angles to the golfer and they start to stream live video feeds to the console 102 on which the user 101 can now see each of the image streams in real-time. From the console 102, the user 101 can view the image streams from some or all the camera angles at once or choose and switch between various camera angles. Thus, the user 101 can get real-time feedback of the golf swing in the display screen of the console 102.

In one embodiment, the user 101 can initiate camera recording from the console, which will cause commands to be sent to each of the camera devices commanding them to start recording video streams for a selected time duration. The user then swings the club for more times while the recording is taking place. Once the recordings are complete, the camera devices will transmit the recorded video streams along with start and stop times associated with each stream over the wireless connections to the console 102. Due to lag or other communication or processing delays, the start and stop times for each stream may be slightly different. Once the streams are received at the console device, the streams will be time-aligned and merged into a single merged video stream. For example, in one embodiment, the start and stop times of each stream are used to time align the streams so that the individual streams are precisely time-aligned in the merged stream. For example, after receiving the recordings from each of the camera devices, the application 114 on the console synchronizes video keyframes based on the start and stop time information received from each stream to merge the time-aligned video streams into the merged stream. Thus, the merged stream comprises two or more streams that are precisely time-aligned so that the user can see the golf swing from different camera angles at any point in time.

Once the merging is complete, the application 114 will notify the user 101 that the merged video stream is available for viewing. In one embodiment, the console 102 can also transmit the merged stream over a network connection 113 to a network server 104 or other network entity to allow review and comment by third parties.

To provide true portability, even in remote locations without access to the Internet, the console 102 and the camera devices (105, 106, 107, and 108) are connected to the same network using a portable router that runs on batteries. Using the portable router also reduces latency so that the video streams will have little to no lag. Also, using the portable router will reduce the cost of having to have a data plan for each of the camera devices and will also decrease battery usage.

In one embodiment, the console 102 is placed on the ground using a kickstand that will be angled in a way that allows the user 101 to look down at the display screen of the console 101 to view the video streams received from the camera devices. The camera devices are placed in locations that provide various angles of the user 101 that are useful for viewing the user's golf swing. In one embodiment, the camera devices are placed to capture a "down-the-line" view (camera 108), a "behind" view (camera 106), a "face-on" view (camera 107), and a "top" view (camera 105) of the user 101 hitting the golf ball 103.

In one embodiment, the application 114 provides an annotation interface. The annotation interface allows the user to annotate and/or draw virtual colored lines on the screen to act as visual aids for various golf aspects, such as plane lines, target lines, hip lines, etc. The user can also insert annotations onto the recorded streams.

In one embodiment, optional peripheral devices, such as a foot pedal 115 or a smartwatch 116, are utilized to send commands to the console 102 without the user 101 having to bend over or pick up the console to press buttons on the console. The peripheral devices are connected wirelessly to the console so that there are less wires to get in the way of the user. If a smartwatch 116 is used as a peripheral device, the smartwatch 116 will provide a user interface which will allow the user to toggle between camera angles. If a foot pedal 115 is used, it will have foot-actuated buttons (or pedals) that will allow the user to toggle the camera angles by pressing the corresponding pedal. Thus, the console 102 will identify the pedals that are pressed and initiate the desired action.

When using the smartwatch 116, the user will have more options in addition to starting and stopping the recording by pushing a button of the smartwatch's user interface. For example, a smartwatch application provides a user interface that allows the user to initiate a command to the console 102, such as start recording. In another embodiment, a command can be issued using a predetermined wrist movement, such as a golf waggle, where the path of the wrist can be detected by a gyroscope installed within the smartwatch 116, which then notifies the console of the detected command.

Once recording of the video streams from the camera devices is completed, the console receives the recorded streams and performs merging in the background, allowing the user to see real-time streams or to create another recording. After the merging is complete, the console provides the user with a notification banner on the console's display to notify the user that the merged video is complete and ready to be viewed. Pressing on the banner will open up and play the merged video. In another embodiment, the user can open a listing of all the previously recorded merged videos and select one of those merged videos to be viewed.

In still another embodiment, the merged video is transmitted over network communication channel 113 (e.g., Internet) to an external server 104. A third party accesses the merged video on the external server 104 and can review and annotate the merged video to generate an updated merged video that is returned back to the console 102 for viewing by the user.

In accordance with another novel aspect, the system 100 provides coaching functionality. A coach is able to install the software application 114 on their mobile, tablet, or desktop device, or to access an online, web-based portal, and view the real-time streams of a golfer practicing their swing. The system 100 allows the golfer to configure the console 102 and any number of camera devices at desired viewing angles and to establish a connection with one or more coaches that can view each video stream and/or merged video streams.

One or more coaches can provide real-time feedback, annotate, comment, track performance, and golf swing training sessions for one or more golf students. For example, the golfer generates a share link or access code on the console device 102 that is then shared with one or more coaches. The one or more coaches access the share link or input the access code on their respective mobile application or web-based portal thereby establishing a session between the one or more coach devices and the console 102 nearby the golfer. This allows coaches to remotely or on-site (e.g., club house) provide feedback and coach golfers on their golf swing.

In other embodiments, the system 100 provides a marketplace in which coaches offer their golf swing training services. Golf students are able to purchase training sessions via the system 100. Golf students are also able to rank coaches and track their progress and performance.

Figure 2:
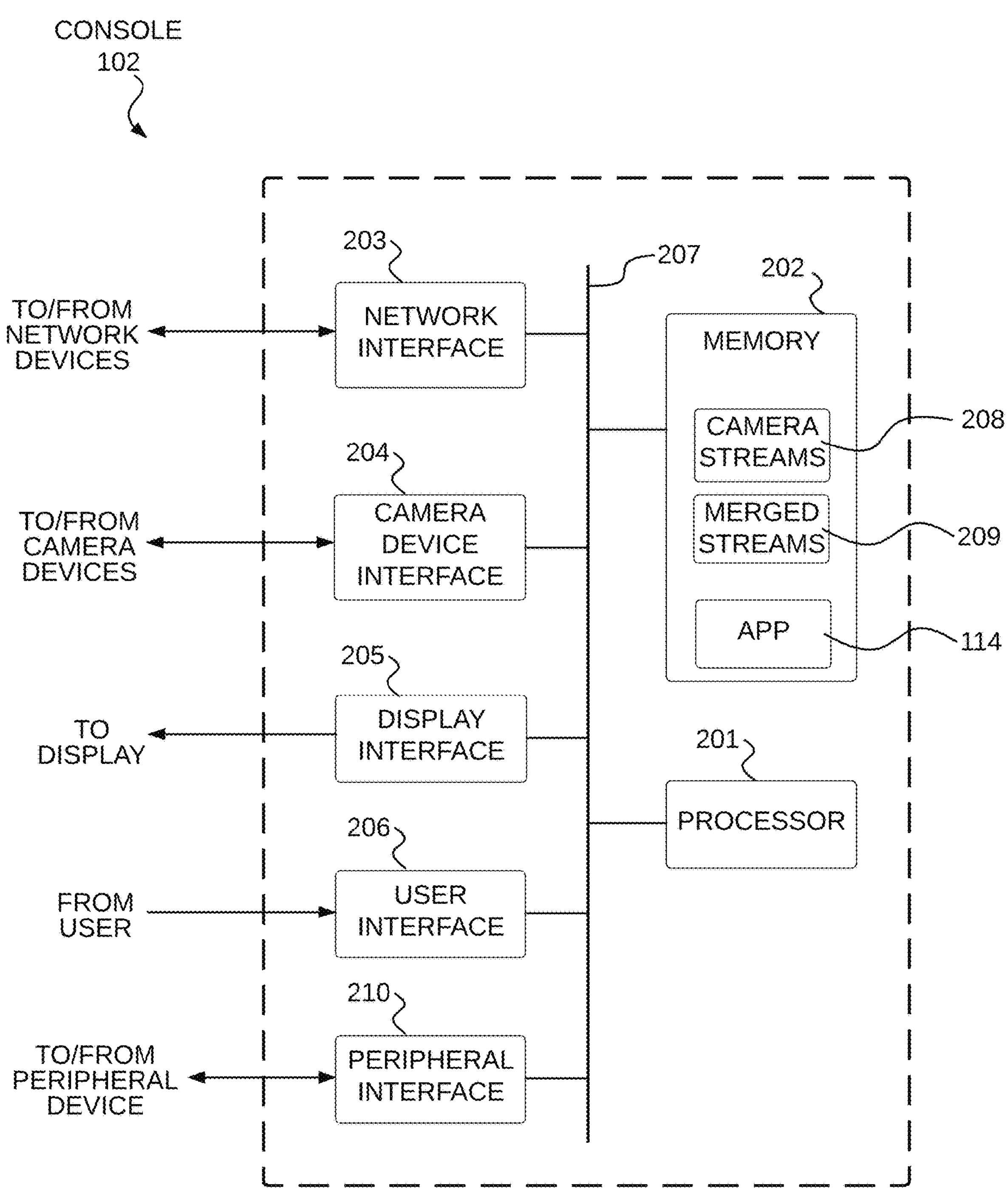
FIG. 2 is a diagram showing a console device for use in a golf swing acquisition system.

FIG. 2 is a diagram showing the console device 102 for use in a golf swing acquisition system. In one embodiment, the console device 102 comprises a processor 201, memory 202, network interface 203, camera device interface 204, display interface 205, user interface 206, and peripheral device interface 210. In various embodiments, the console device 102 comprises a CPU, gate array, processors, programmable logic, registers, memory devices, discrete logic and/or other suitable logic and electronics to perform the functions described herein.

The user interface 206 receives user input from a user 101. The display interface 205 outputs user feedback to be shown on a display screen. The camera device interface 204 communicates with multiple camera devices using a wireless communication channel. For example, the processor 201 sends commands to the camera devices through the interface 204 and receives video streams from the camera devices through the interface 204. The network interface 203 provides communications with network entities over a network connection, such as the network connection 113. The peripheral interface 210 provides communication to/from peripheral devices, such as a foot pedal or smartwatch, to allow these devices to input commands from the user to the processor 201.

The memory 202 comprises any suitable type of memory, such as RAM, or programmable memory that stores camera streams 208 received from the camera devices, and merged streams 209 that have been generated from the camera devices. The memory 202 also stores the application 114 that is executed by the processor 201 to implement the functions described herein.

Figure 3:
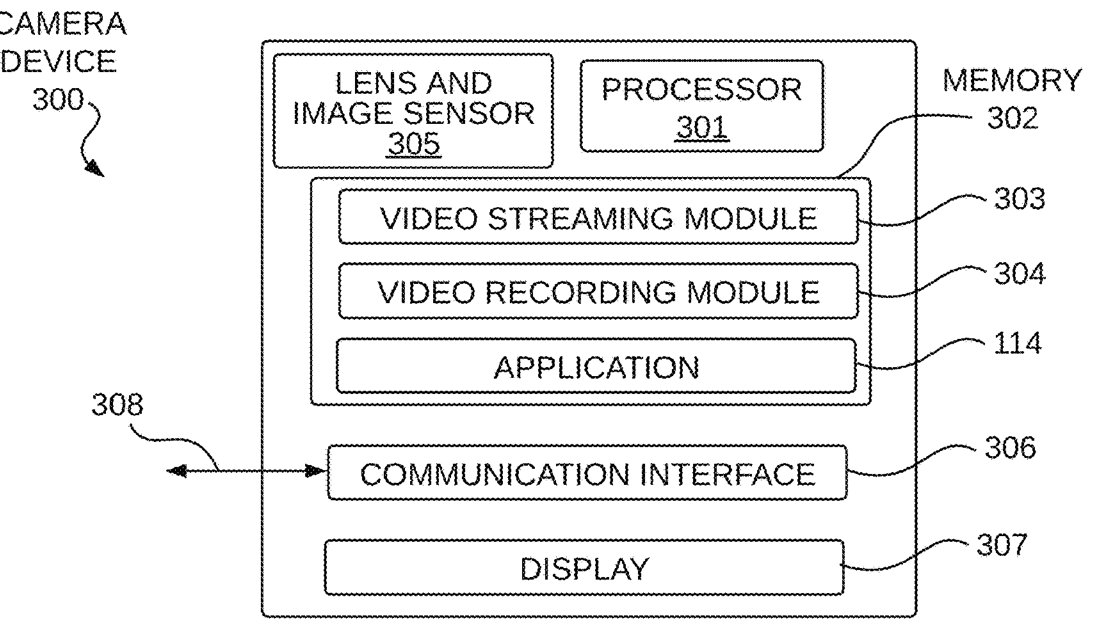
FIG. 3 is a diagram showing a camera device for use in a golf swing acquisition system.

FIG. 3 is a diagram showing a camera device 300 for use in a golf swing acquisition system. For example, the camera device 300 is suitable for use as any of the camera devices (105, 106, 107, and 108) shown in FIG. 1. In one embodiment, the camera device comprises a smartphone, tablet computer, or any other suitable computing device.

In one embodiment, the camera device 300 comprises processor 301, memory 302, lens and image sensor assembly 305, communication interface 306, and display screen 307. The memory 302 further comprises a video streaming module 303, a video recording module 304, and the application 114.

During operation, the processor 301 executes the application 114 to control the camera device 300 to acquire a real-time video stream from the lens and image sensor assembly 305. The processor 301 also executes the video streaming module 303 to produce a real-time video stream that is transmitted by the communication interface 306 to the console 102 over wireless communication channel 308.

The communication interface 306 also receives commands from the console 102 over the communication channel 308 and these commands are passed to the processor 301. For example, a record command is received from the console 102 and passed to the processor 301, which executes the video recording module 304 to record the real-time video stream for a selected time duration. The processor 301 then controls the communication interface 306 to transmit the recorded video stream over the communication channel 308 to the console 102.

Figure 4:
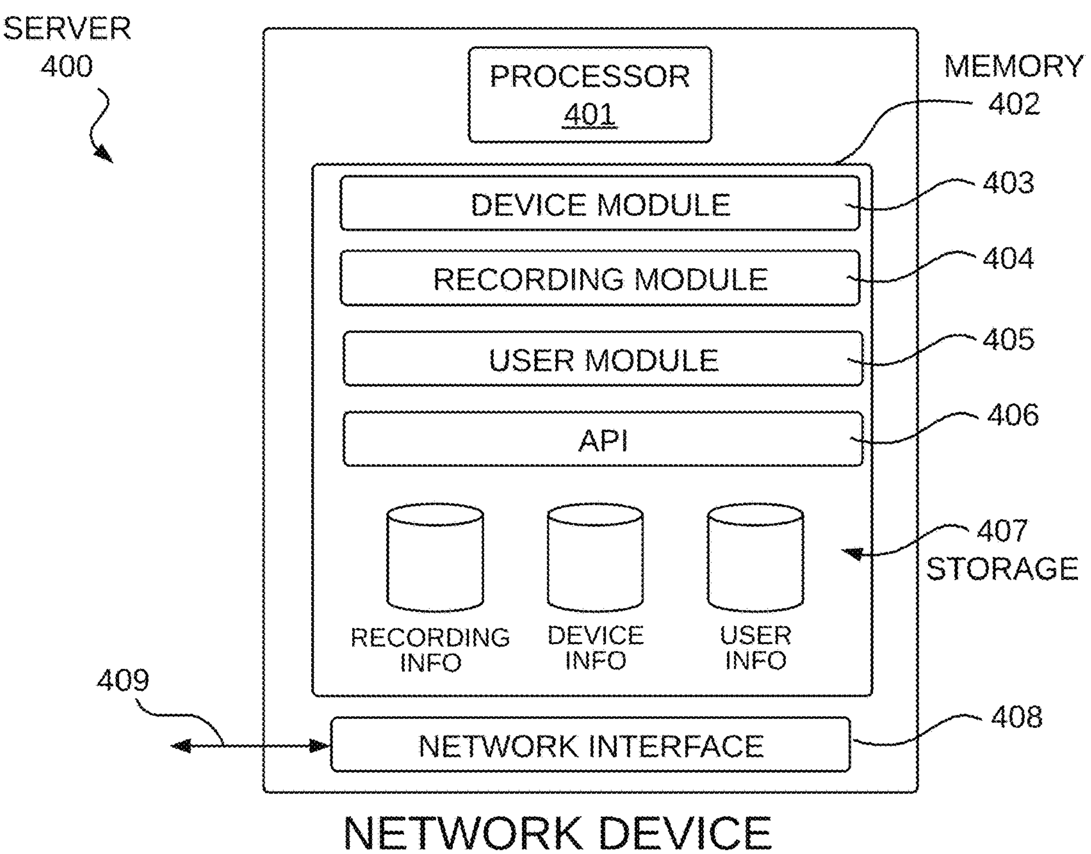
FIG. 4 is a diagram showing a network device for use in a golf swing acquisition system.

FIG. 4 is a diagram showing a network server 400 for use with a golf swing acquisition system. For example the network server 400 is suitable for use as the network server 104 shown in FIG. 1.

In one embodiment, the network server 400 comprises processor 401, memory 402, and network interface 408. The memory 402 further comprises a device module 403, recording module 404, user module 405, application programming interface (API) 406, and storage 407. The network server 400 utilizes the network interface 408 to communication over a network communication channel 409.

FIG. 5A is a diagram showing how camera devices transmit their respective image streams to the console device 102 using a wireless transmission. For example, the down-the-line camera 108 transmits its image stream S1 109 to the console 102. Likewise camera 107, camera 106, and camera 105 transmit their respective image streams S3 111, S2 110, and S4 112 to the console 102. The console displays the live image streams to the user or merges the received streams to form the merge stream 209.

Figure 5B:
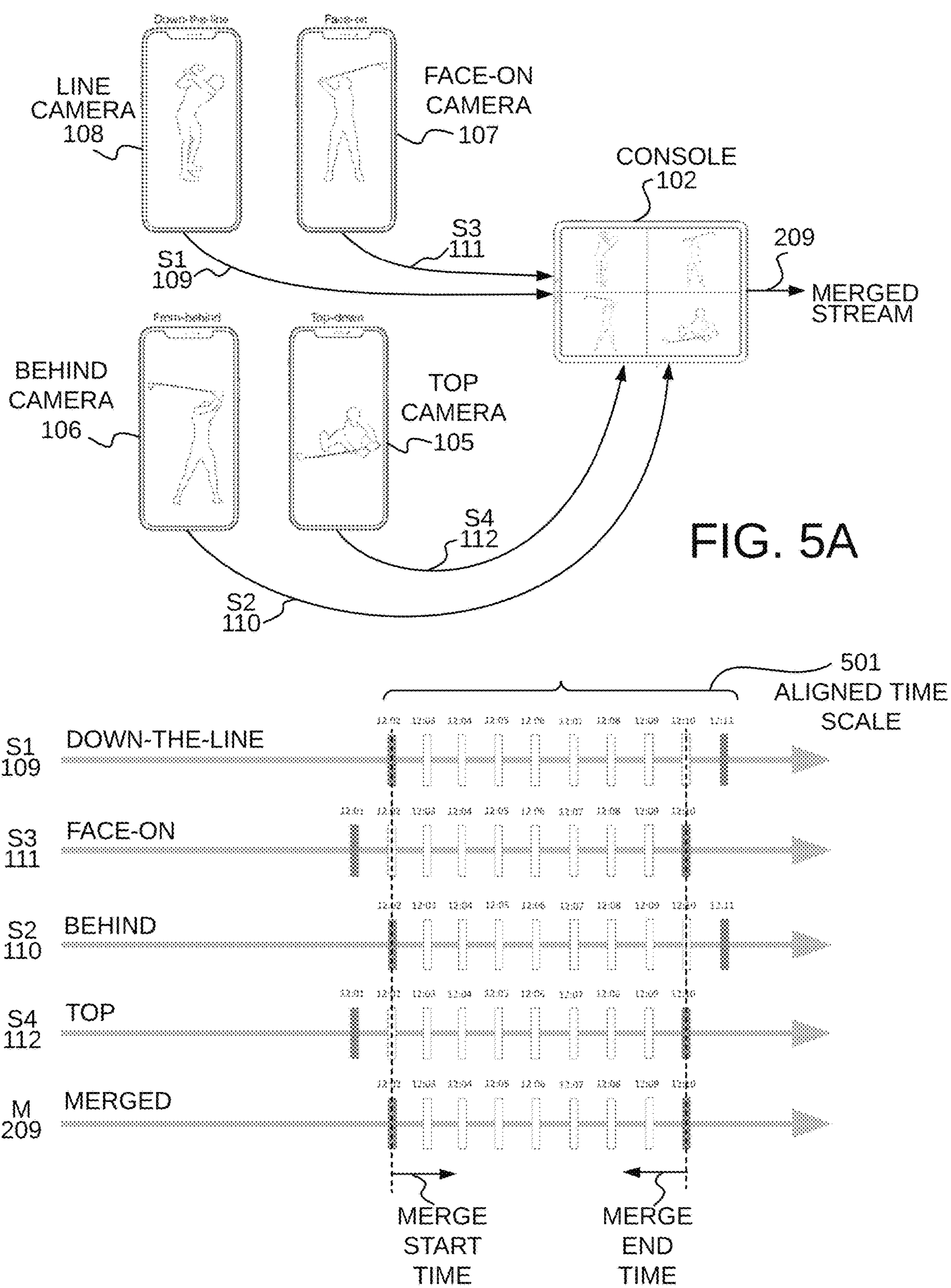
FIG. 5B is a diagram showing how start and end times are defined for a plurality of image streams.

FIG. 5B is a diagram showing how a merge start time and a merge end time are defined for a plurality of image streams to be merged. For example, each recorded image stream received at the console 102 from a camera device includes timing information. After all the image streams are received, the console 102 operates to define a time scale that is common to all streams so that the streams can be time-aligned. A merge start time is defined as a time value that is the same or older than the oldest start time of the aligned recorded image streams. A merge end time is defined as a time value that is the same or earlier than the earliest end time of the aligned recorded image streams.

The portions of the recorded streams within the merge start time and merge stop time are merged into a merged stream 209 and can be displayed on the console display. By defining the merge start and end times, time variations between the streams due to lag or buffering can be eliminated.

Figure 6:
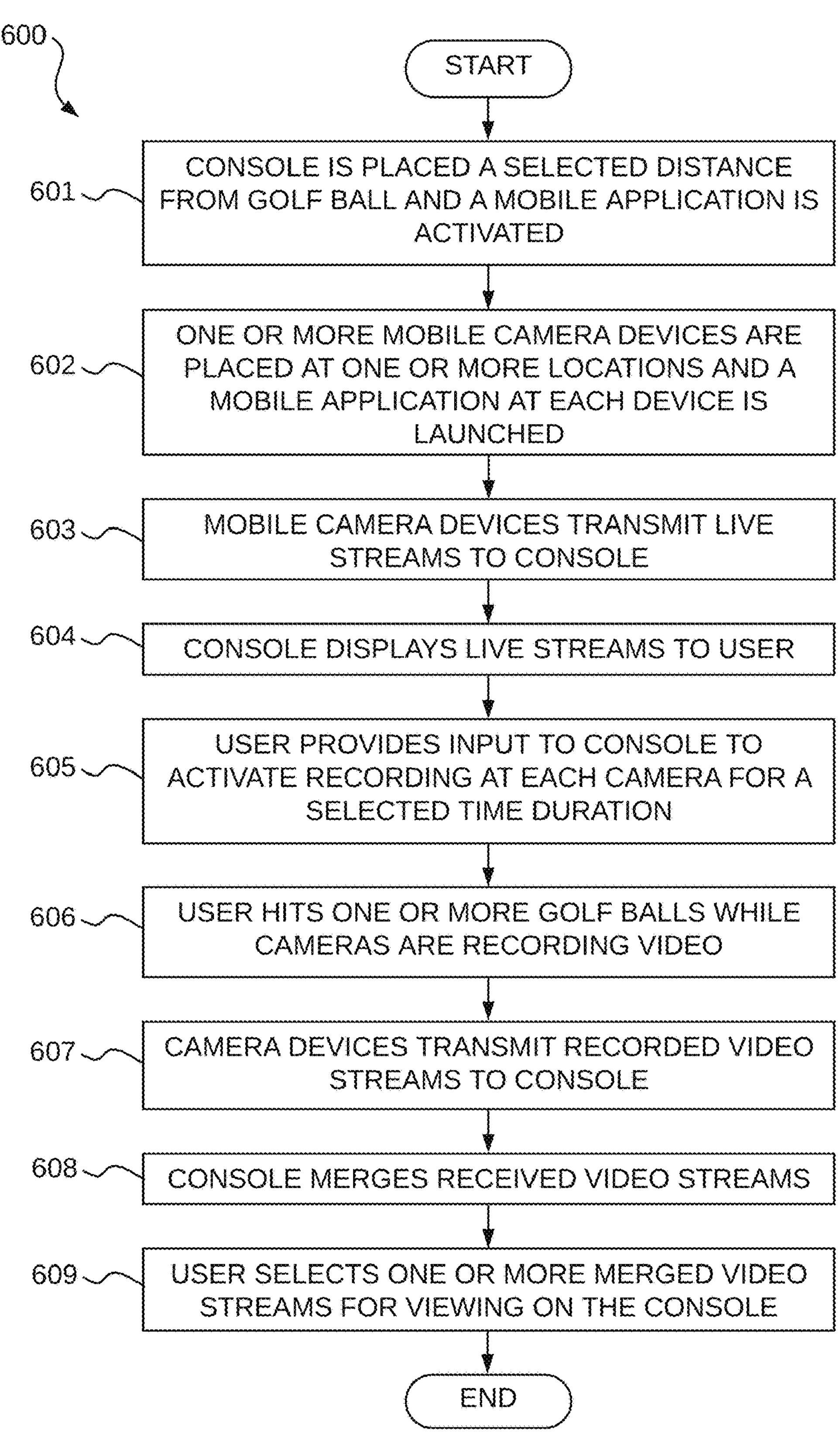
FIG. 6 shows a method for operating a golf swing acquisition system.

FIG. 6 shows a method 600 for operating a golf swing acquisition system. For example, the method is suitable for use with the golf swing acquisition system 100 shown in FIG. 1. It should be noted that in one embodiment, method 600 is implemented by the application 114 executing on the console 102 and the camera devices.

At block 601, the console is placed at a selected distance from the golf ball and a mobile application on the console is activated.

At block 602, one or more camera devices are placed at selected locations around the location of the golf ball and a mobile application at each device is activated.

At block 603, the camera devices transmit live video streams to the console.

At block 604, the console displays the live video streams to the user.

At block 605, the user provides input to the console to activate image recording at the camera devices for a selected time duration.

At block 606, a user swings a golf club to hit the golf ball while the camera devices are recording video streams.

At block 607, the camera devices transmit their recorded video streams to the console.

At block 608, the console merges the received video streams. In one embodiment, the streams are time-aligned prior to merging as described above with reference to FIG. 5.

At block 609, the user selects one or more merged video streams for viewing on the console display.

Thus, method 600 is configured to operate a golf swing acquisition system. It should be noted that the operations of method 600 are exemplary and not limiting and that the operations can be added to, deleted, rearranged or otherwise modified within the scope of the embodiments.

Figure 7:
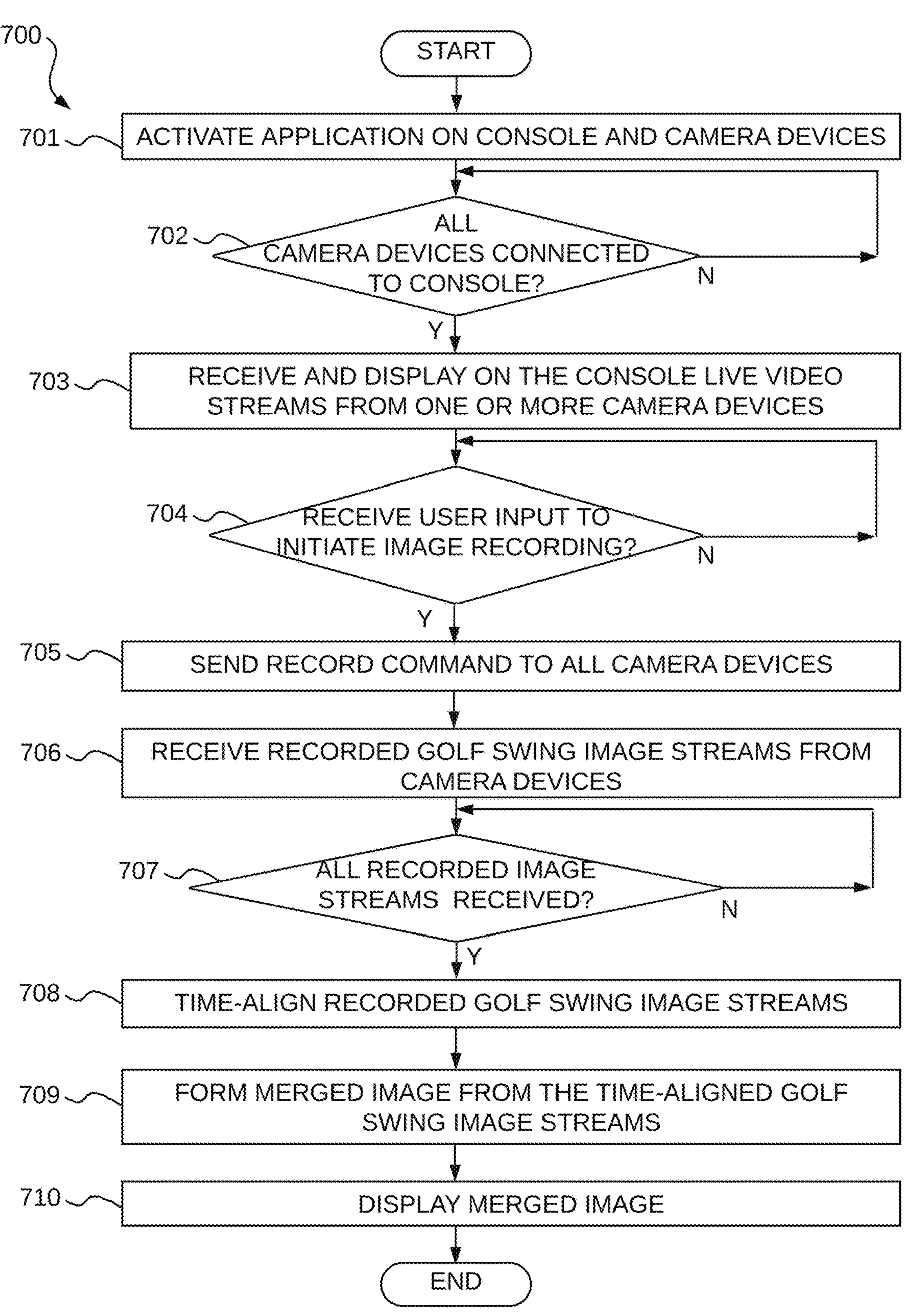
FIG. 7 shows an alternative method for operating a golf swing acquisition system.

FIG. 7 shows an alternative method 700 for operating a golf swing acquisition system. For example, method 700 is suitable for use with the golf swing acquisition system 100 shown in FIG. 1. It should be noted that in one embodiment, method 700 is implemented by the application 114 executing on the console 102 and the camera devices.

At block 701, an application is activated on a console device and multiple camera devices.

At block 702, a determination is made as to whether all the camera devices have established wireless connections to the console device. If there are cameras that are not connected to the console device, the method remains at block 702. If all cameras are wirelessly connected to the console device 102, the method proceeds to block 703.

At block 703, live video streams transmitted from the camera devices are received and displayed at the console 102.

At block 704, A determination is made as to whether user input has been received to initiate image recording at the camera devices, if the user input has not been received the method remains at block 703. If the user input to initiate image recording has been received, the method proceeds to block 705.

At block 705, a command to initiate recording is sent to all camera devices in response to receiving the user input to activate recording.

At block 706, recorded golf swing image streams are received from the camera devices in response to the record command.

At block 707, a determination is made as to whether all recorded image streams have been received from all the camera devices. If all the recorded image dreams have not been received, the method remains at block 707. If all recorded image streams have been received from all cameras, the method proceeds to block 708.

At block 708, the received recorded image streams are time-aligned to have a common time scale.

At block 709, a merged image stream is created from the time aligned image streams. For example, the merged image stream has a start time that is the same or older than the oldest start time of the recorded image streams, and the merged image stream has a stop time that is the same or earlier than the earliest stop time of the recorded image streams.

At block 710, the merged image stream is displayed on the console display.

Thus, method 700 is configured to operate on a golf swing acquisition system. It should be noted that the operations of method 700 are exemplary and not limiting and that the operations can be added to, deleted, rearranged or otherwise modified within the scope of the embodiments.

Figure 8:
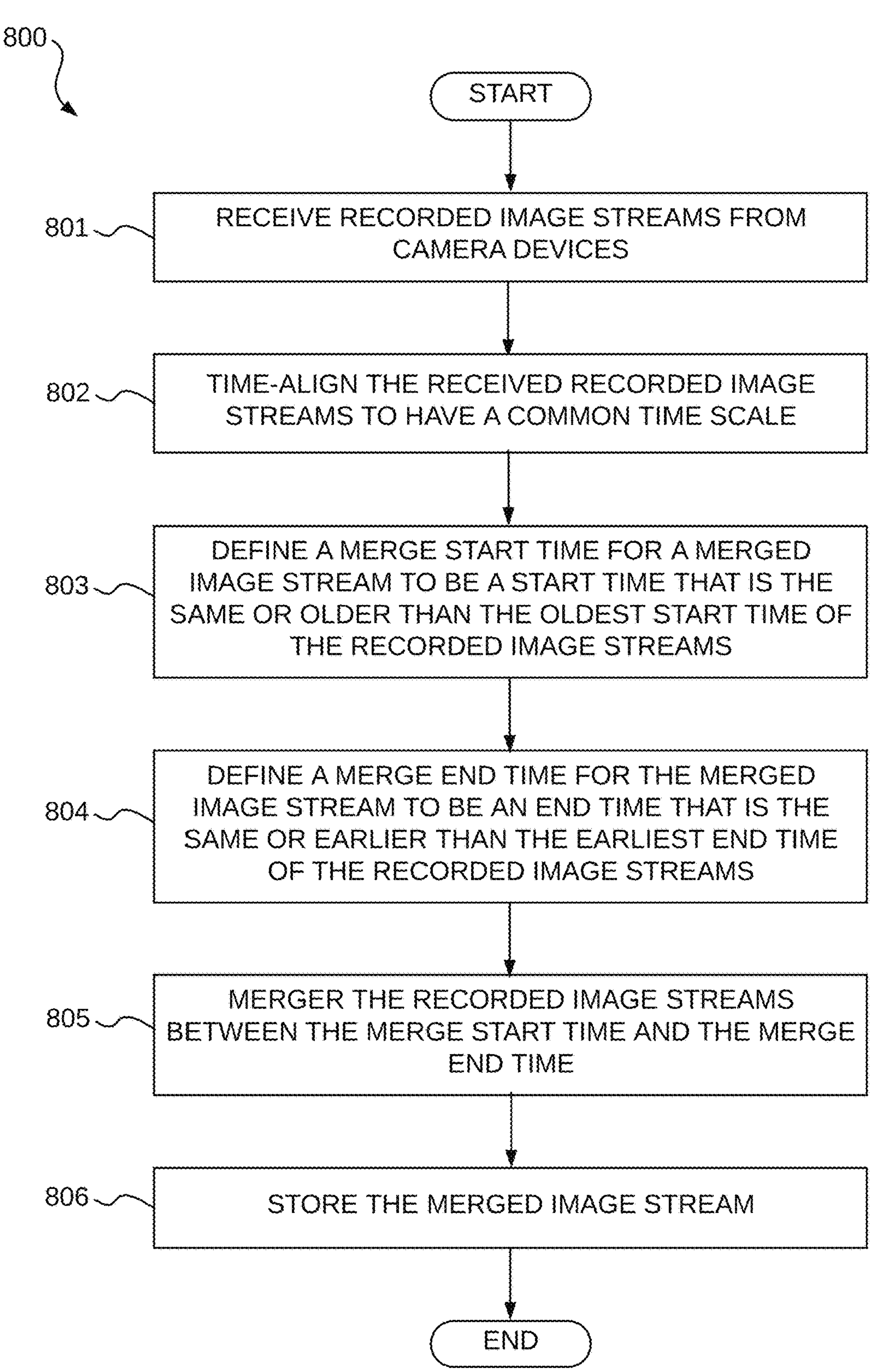
FIG. 8 shows a method for merging a plurality of recorded golf swing video streams.

FIG. 8 shows a method 800 for merging a plurality of recorded image streams. For example, in one embodiment, the method 800 is performed by the application 114 running on the console 102.

At block 801, recorded image streams are received at the console 102 from the plurality of camera devices.

At block 802, the received recorded image streams are time-aligned to have a common time scale.

At block 803, a merge start time is defined to be a time value that is the same or older than the oldest start time of the recorded image streams.

At block 804, a merge end time is defined to a time value that is the same or earlier than the earliest end time of the recorded image streams.

At block 805, portions of the received recorded image streams between the merge start time and the merge end time are merged together to form a merged image stream.

At block 806, the merged image stream is stored in memory. For example, the merged image stream 209 is stored in the memory 202 or in a cloud based storage system.

Thus, method 800 is configured to merge a plurality of recorded image streams. It should be noted that the operations of method 800 are exemplary and not limiting and that the operations can be added to, deleted, rearranged or otherwise modified within the scope of the embodiments.

Figure 9:
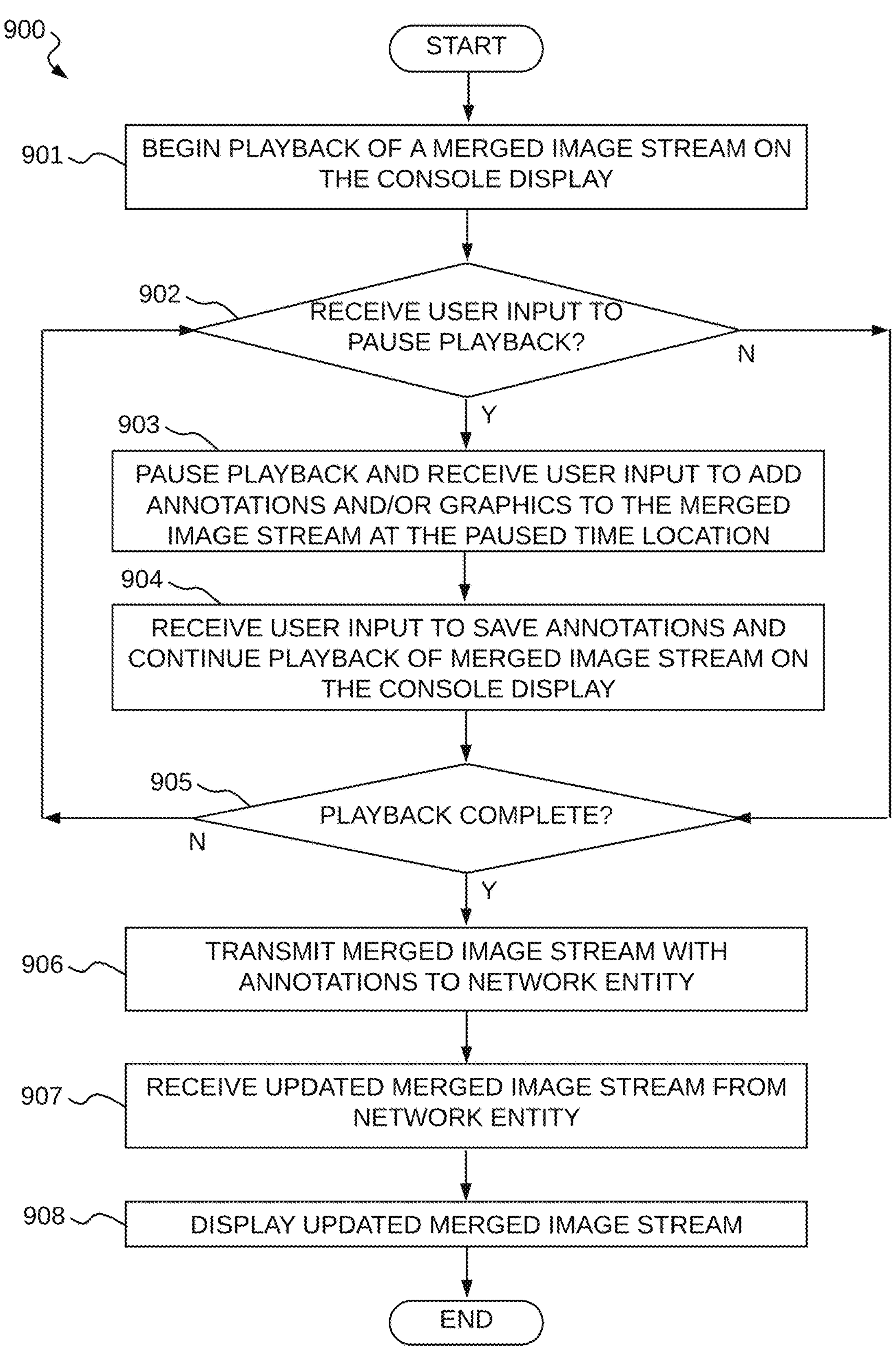
FIG. 9 shows a method for providing annotation and feedback to a merged golf swing video.

FIG. 9 shows a method for providing annotation and feedback to a merged image stream. For example, in one embodiment, the method 900 is performed by the application 114 running on the console 102.

At block 901, a playback of a merged image stream on the display of the console is started.

At block 902, a determination is made as to whether user input to pause the playback has been received. If the user input to pause the playback has been received, the method proceeds to block 903. If no user input is received, the method proceeds to block 905.

At block 903, the playback of the merged image stream is paused and user input is received to add annotations and/or graphics to the merged image stream at the paused location.

At block 904, user input is received to save the annotations and/or graphics and continue playback of the merged image stream.

At block 905, a determination is made as to whether the playback of the merged image stream is complete. If the playback is not complete, the method proceeds to block 902. If the playback is complete, the method proceeds to block 906.

At block 906, the merged image stream with or without annotations is transmitted to a network entity. For example, the merged image stream is transmitted over the network communication channel 113 to the server 104. The server 104 is accessible by a third party, such as an instructor that can retrieve and view the merged image stream. In one embodiment, the instructor provides annotations and feedback that is added to the merged image stream to form an updated merged image stream.

At block 907, an updated merged image stream with annotations and/or graphics is received from the network entity. For example, the instructor annotates the merged image stream to form the updated image stream and transmits the updated image stream back to the console 102.

At block 908, the updated image stream is displayed on the display of the console 102.

Thus, method 900 is configured to provide annotation and feedback to a merged image stream. It should be noted that the operations of method 900 are exemplary and not limiting and that the operations can be added to, deleted, rearranged or otherwise modified within the scope of the embodiments.

FIGS. 10-18 are diagrams showing screenshots generated by a mobile application for use with a golf swing acquisition system.

Figure 10:
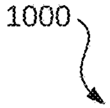
FIGS. 10-18 are diagrams showing application screen shots for use with a golf swing acquisition system.
Figure 10:
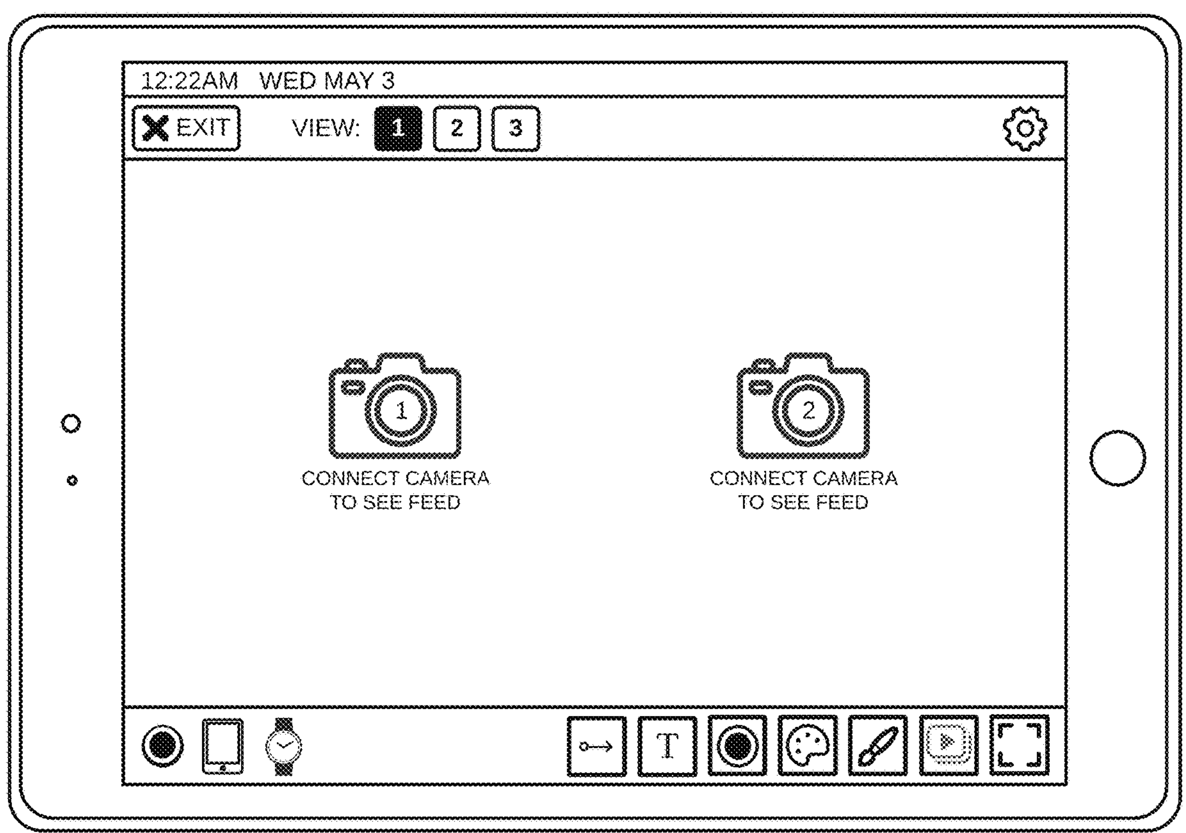

FIG. 10 shows a screen shot 1000 that displays a two-camera screen layout before any camera streams are selected for display.

Figure 11:
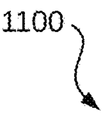
Figure 11:
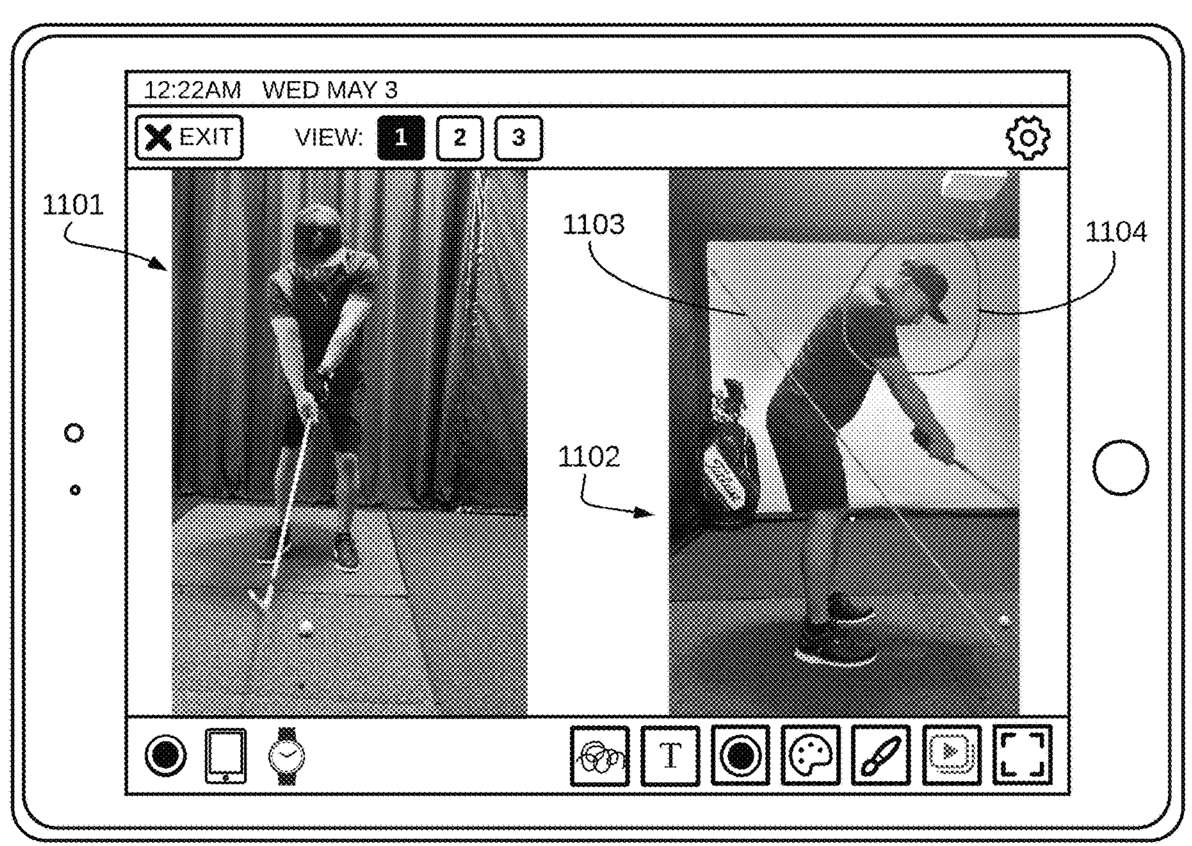

FIG. 11 shows a screenshot 1100 that displays a two-camera screen layout after two video streams have been selected for display. The first video stream 1101 shows the video output of the face-on camera 107. The second video stream 1102 shows the video output of the down-the-line camera 108. Also shown in FIG. 11 are annotations. A first annotation 1103 is a line that represents an angle of the user's hips. A second annotation 1104 is a circle that highlights the position of the user's head.

Figure 12:
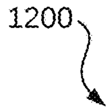
Figure 12:
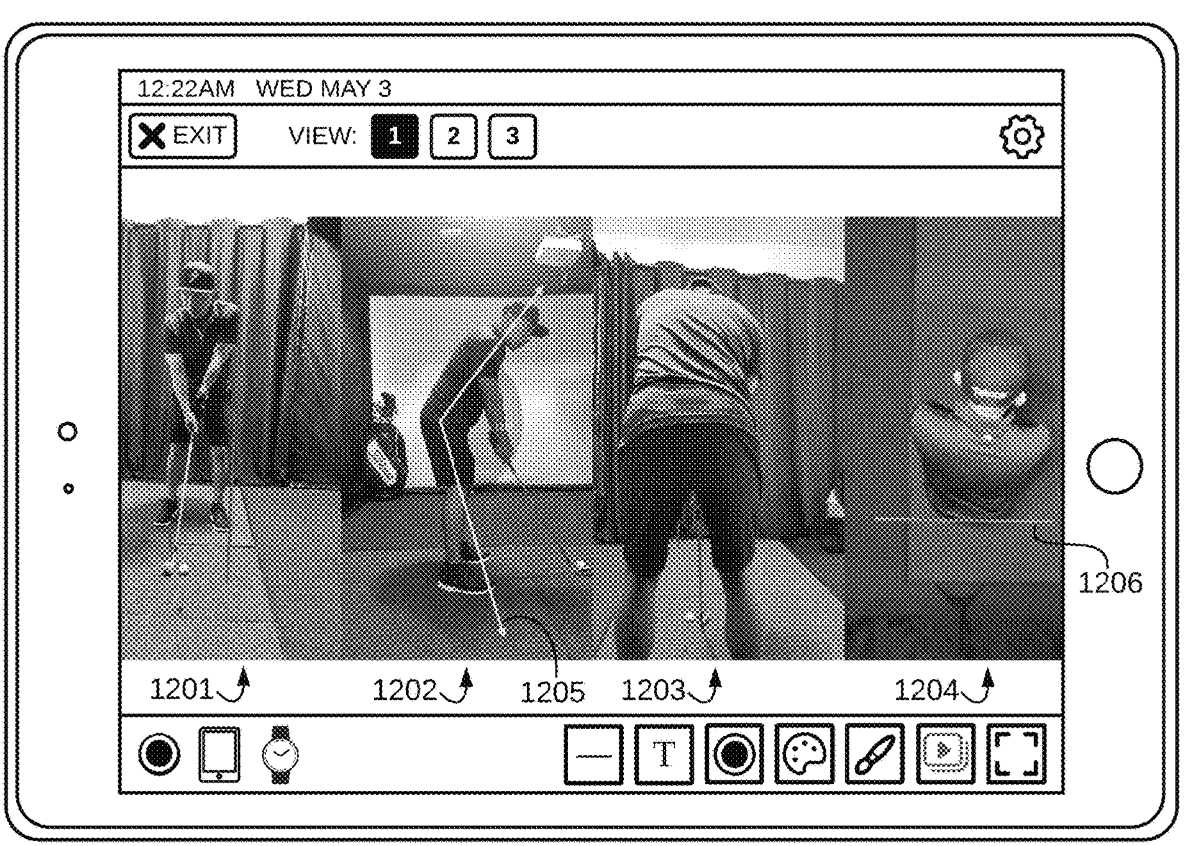

FIG. 12 shows a screenshot 1200 that displays a four-camera screen layout in which four video streams have been selected for display. The first video stream 1201 shows the video output of the face-on camera 107. The second video stream 1202 shows the video output of the down-the-line camera 108. The third video stream 1203 shows the video output of the behind camera 106. The fourth video stream 1204 shows the video output of the top camera 105. Also shown in FIG. 12 are annotations. A first annotation 1205 is a line that represents an angle between the user's upper torso and the user's legs. A second annotation 1206 is a line that highlights the alignment of the user's hips.

Figure 13:
Figure 13:
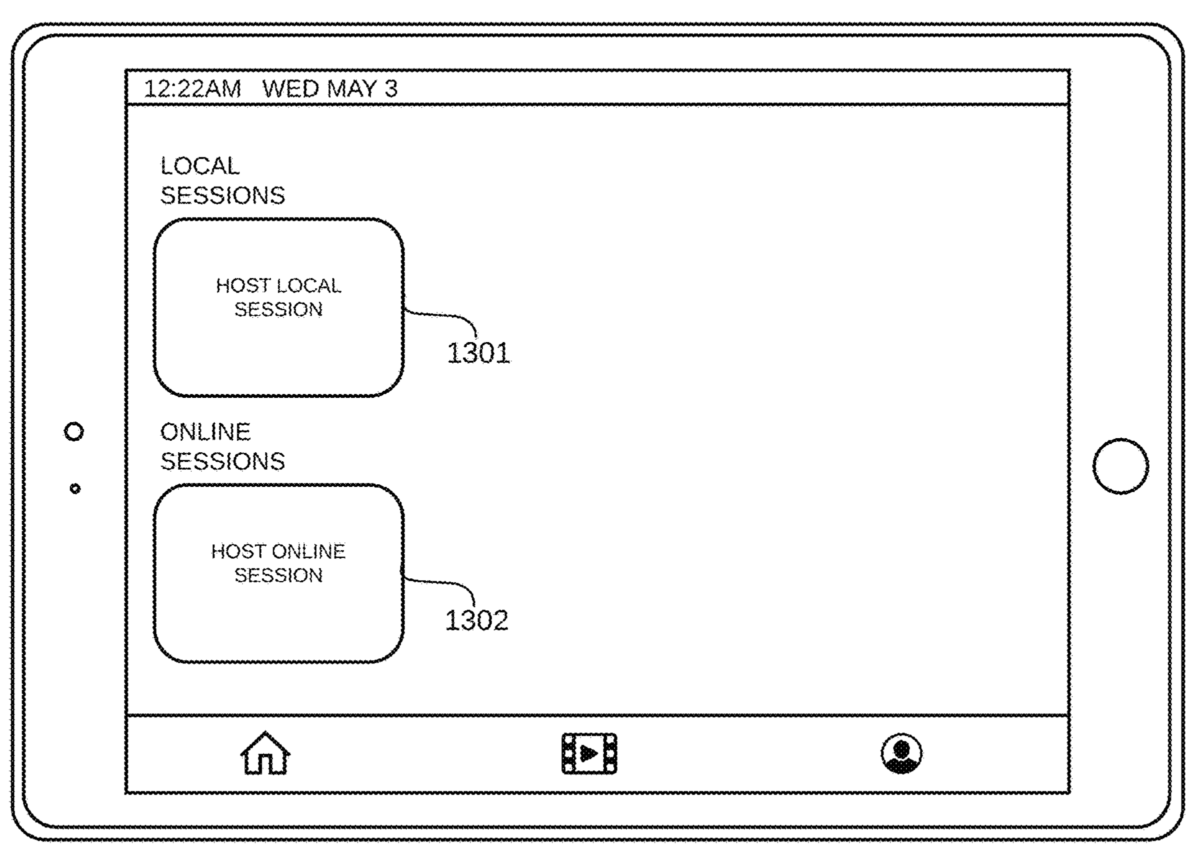

FIG. 13 shows a screenshot 1300 that displays a screen layout of a landing page that allows selection of a local session 1301 or an online session 1302.

Figure 14:
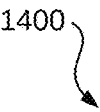
Figure 14:
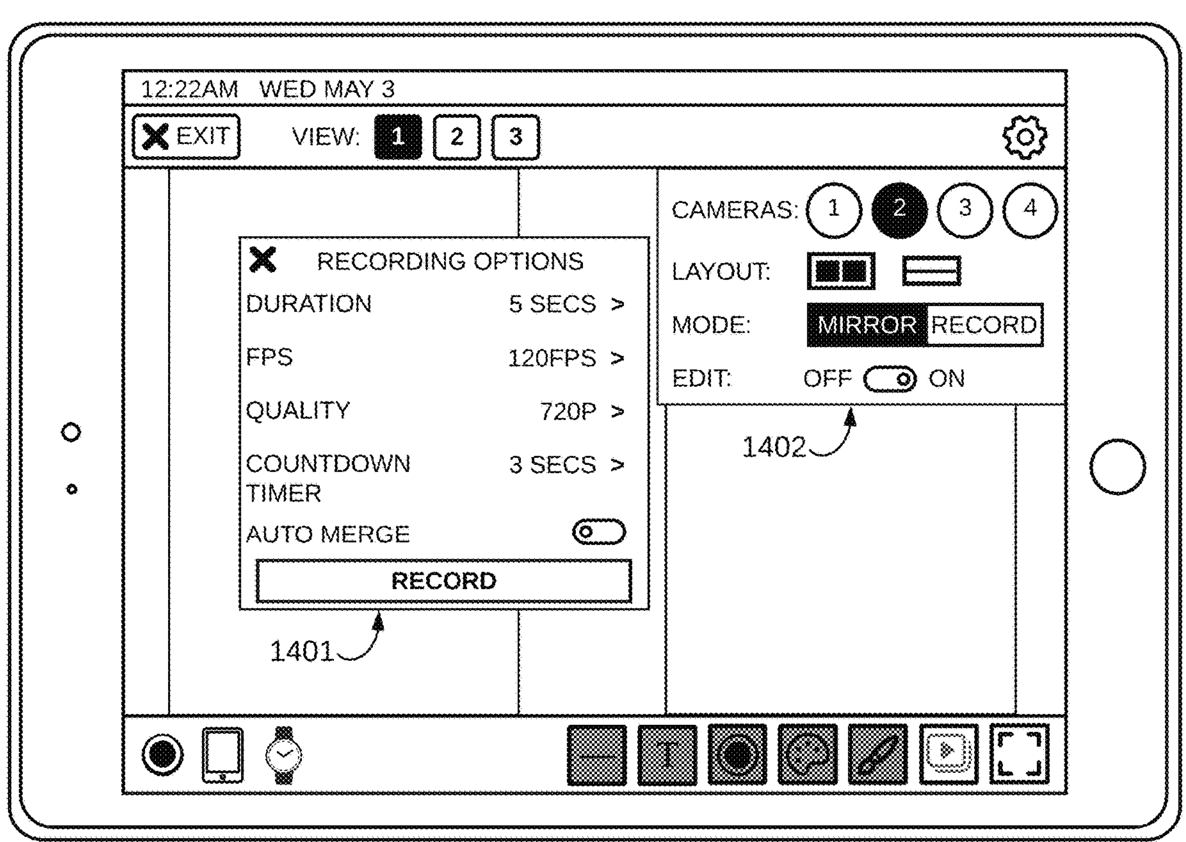

FIG. 14 shows a screenshot 1400 that displays a screen layout of a recording menu that provides recording options 1401 and camera mode selection 1402.

Figure 15:
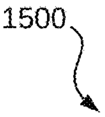
Figure 15:
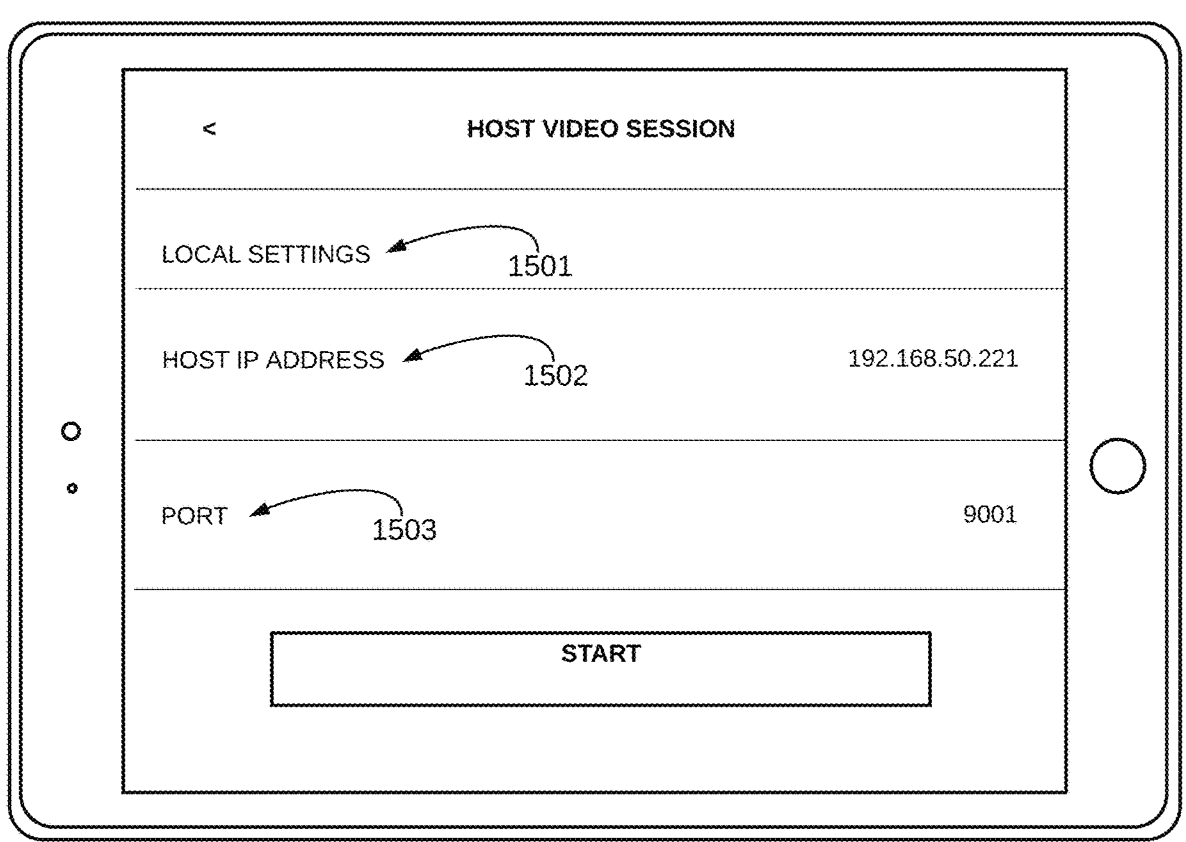

FIG. 15 shows a screenshot 1500 that displays a screen layout of a host video session menu that displays local settings 1501, host IP address 1502, and port number 1503.

Figure 16:
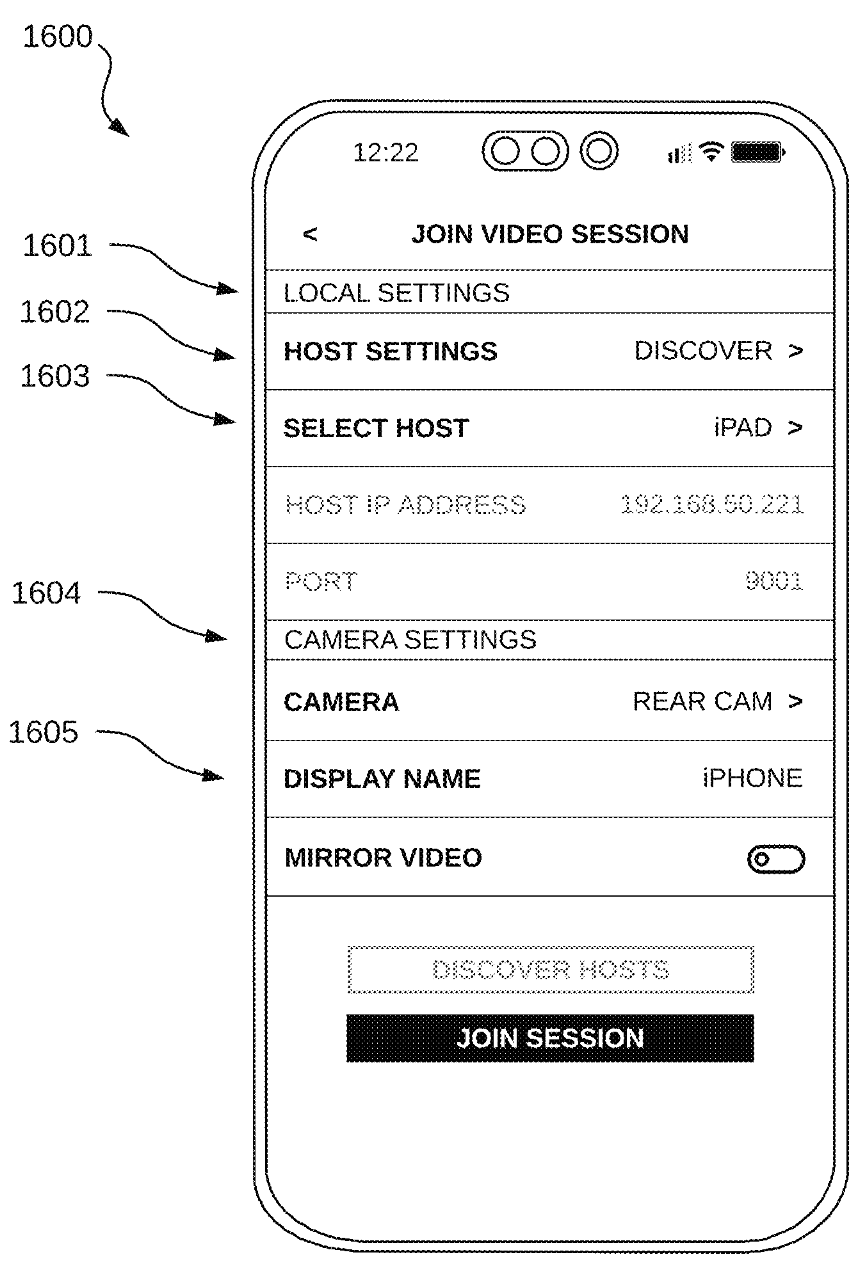

FIG. 16 shows a screenshot 1600 that displays a screen layout of a session join menu that displays local settings 1601, host settings 1602, host select 1603, camera settings 1604, and display settings 1605.

Figure 17:
Figure 17:
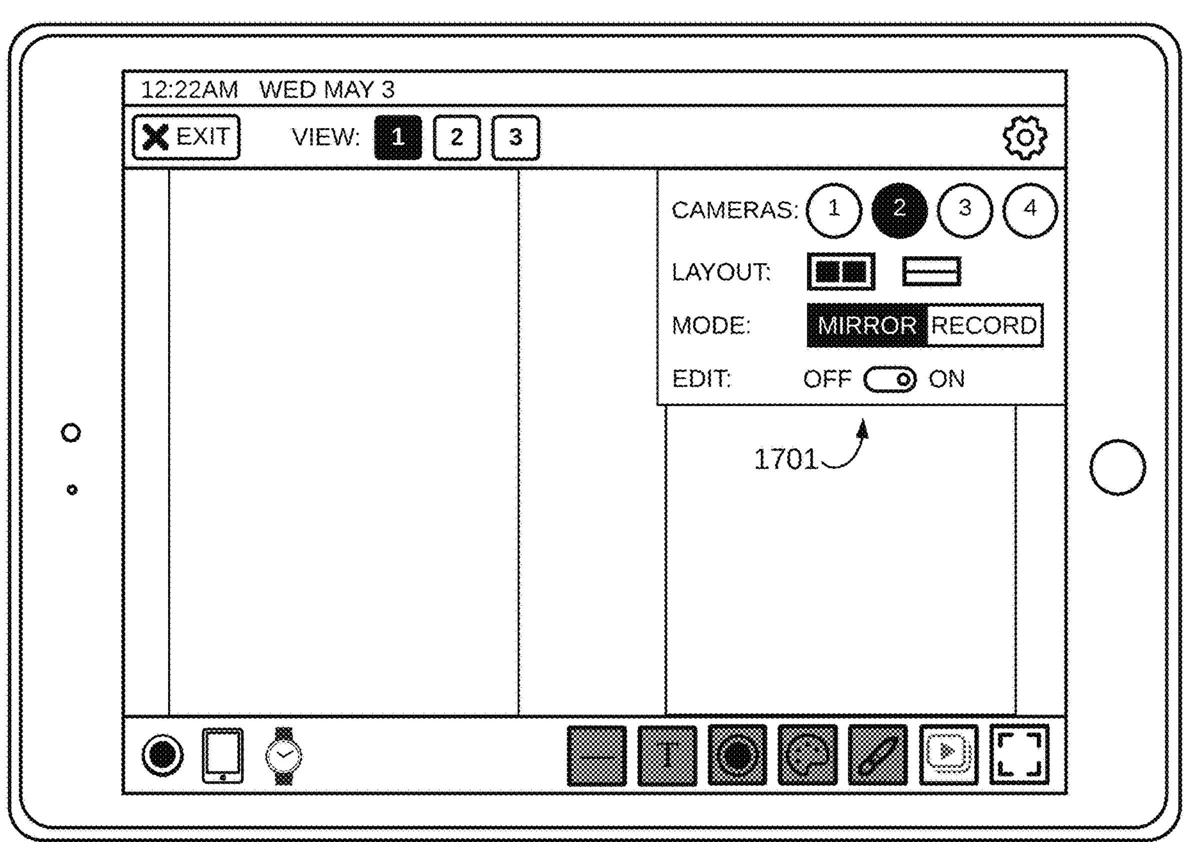

FIG. 17 shows a screenshot 1700 that displays a screen layout of a general settings menu that provides a camera mode selection 1701.

Figure 18:
Figure 18:
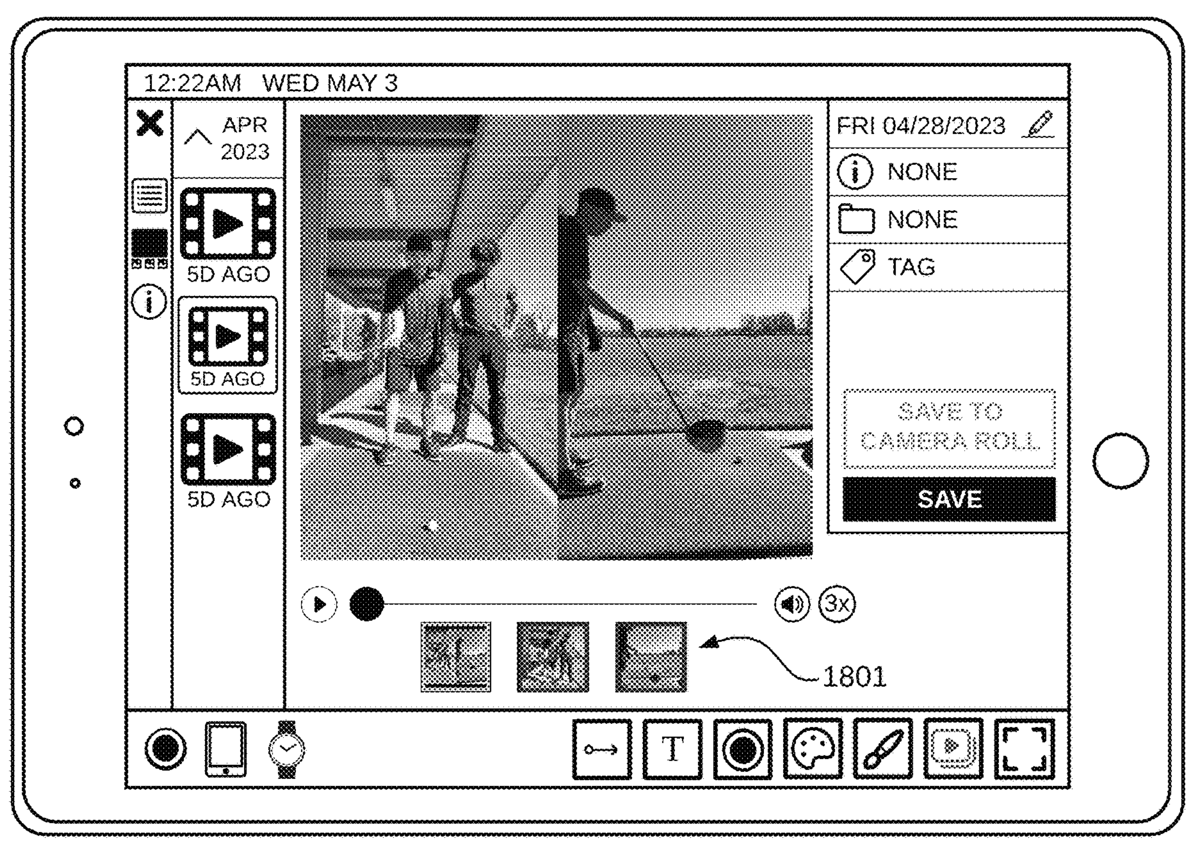

FIG. 18 shows a screenshot 1800 that displays a screen layout of a video library menu that allows selection of stored merged videos 1801 for playback.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method for capturing and merging golf swing video, comprising:

establishing connections to a plurality of cameras that are configured to record video streams of a golf swing of a user from a plurality of different viewing angles during a same time period of the golf swing;

receiving input from the user via a wearable device, wherein the input comprises detecting a golf waggle wrist movement using the wearable device;

initiating transmission of the recorded video streams from the plurality of cameras in response to the detected golf waggle wrist movement;

receiving the recorded video streams over the established connections;

identifying a start time and a stop time associated with each video stream;

combining the video streams from the plurality of different viewing angles based on their respective start and stop times to form a combined video stream, wherein the single combined video stream has a start time that is after the last start time of the recorded video streams, and an end time that is before the earliest end time of the recorded video streams, and wherein combining comprises automatically synchronizing a plurality of video keyframes of the recorded video streams based on a start and stop time of each recorded video stream to eliminate timing variation due to network lag or buffering; and displaying the combined video stream.

2. The method of claim 1, further comprising:

establishing the connections over a local network that is accessible to the plurality of cameras.

3. The method of claim 1, further comprising:

initiating the transmission of recorded video streams in response to the input from the user into a central controller.

4. The method of claim 3, further comprising:

receiving the recorded video streams at the central controller.

5. The method of claim 3, further comprising:

identifying the start time and the stop time associated with each video stream at the central controller.

6. The method of claim 3, further comprising:

displaying the combined video stream on a display screen of the central controller.

7. The method of claim 3, further comprising:
transmitting the combined video stream from the central controller to a server on a second network.

8. The method of claim 7, further comprising:
overlaying annotations onto the combined video stream.

9. The method of claim 8, further comprising:
receiving the annotations from the user through user input at the central controller.

10. The method of claim 8, further comprising:
receiving the annotations at the central controller in a transmission received from the second network.

11. The method of claim 1, wherein the local network is a WIFI or Bluetooth network.

12. The method of claim 1, wherein the second network is the Internet.

13. An apparatus, comprising:
a plurality of cameras that are configured to record video streams of a golf swing a user from a plurality of different viewing angles during a same time period of the golf swing;
a wearable device configured to detect a golf waggle wrist movement and transmit a command in response to the detected golf waggle wrist movement; and
a portable control console configured to:
establish connections to the plurality of cameras;
receive the command from the wearable device;
initiate transmission of the recorded video streams from the plurality of cameras in response to the command from the wearable device;
receive the recorded video streams over the established connections;
identify a start time and a stop time associated with each video stream;
merge combine the video streams from the plurality of different viewing angles based on their respective start and stop times to form a combined video stream, wherein the single combined video stream has a start time that is after the last start time of the recorded video streams, and an end time that is before the earliest end time of the recorded video streams, and wherein combining comprises automatically synchronizing a plurality of video keyframes of the recorded video streams based on a start and stop time of each recorded video stream to eliminate timing variations due to network lag or buffering; and
display the combined video stream.

14. The apparatus of claim 13, wherein the portable control console is further configured to:
establish the connections over a local network that is accessible to the plurality of cameras.

15. The apparatus of claim 13, wherein the portable control console is further configured to:
transmit the combined video stream to a server on a second network.

16. The apparatus of claim 15, wherein the portable control console is further configured to:
overlay annotations onto the combined video stream.

17. A system to acquire and display golf swing video captured simultaneously from multiple cameras at different viewing angles, comprising:
a receiver configured to receive golf swing video streams from the multiple cameras, wherein each golf swing video stream has an associated start time and end time;
means for combining the received golf swing video streams to generate a combined video stream that has a combined start time that is after a last start time of the received golf swing video streams, and a combined end time that is before the earliest end time of the received golf swing video streams, and wherein combining comprises automatically synchronizing a plurality of video keyframes of the received golf swing video streams based on a start and stop time of each received golf swing video stream to eliminate timing variations due to network lag or buffering.

18. The system of claim 17, wherein the means is a console device, and wherein the means is also for displaying the combined video stream.

* * * * *